United States Patent [19]
Ferro

[11] Patent Number: 6,038,546
[45] Date of Patent: *Mar. 14, 2000

[54] SYSTEM AND METHOD FOR CREATING A FOOD ORDER SALES RECEIPT IDENTIFYING NUTRITIONAL INFORMATION OF A CUSTOMIZED MEAL

[75] Inventor: Jay Ferro, 900 Embarcadero Del Mar, Suite 2, Goleta, Calif. 93117

[73] Assignee: Jay Ferro, Goleta, Calif.

[ * ] Notice: This patent is subject to a terminal disclaimer.

[21] Appl. No.: 09/112,701

[22] Filed: Jul. 8, 1998

[51] Int. Cl.$^7$ ..................................................... G06F 17/60
[52] U.S. Cl. .............................................................. 705/15
[58] Field of Search ..................................... 705/15, 1, 16

[56] References Cited

U.S. PATENT DOCUMENTS

| | | | |
|---|---|---|---|
| 4,807,169 | 2/1989 | Overbeck | 364/715.01 |
| 4,833,308 | 5/1989 | Humble | 235/383 |
| 4,891,756 | 1/1990 | Williams, III | 364/413.29 |
| 4,911,256 | 3/1990 | Attikiouzel | 177/25.16 |
| 4,954,954 | 9/1990 | Madsen et al. | 364/413.29 |
| 5,033,561 | 7/1991 | Hettinger | 177/25.16 |
| 5,127,880 | 7/1992 | Bar et al. | 462/18 |
| 5,412,564 | 5/1995 | Ecer | 364/413.29 |
| 5,478,989 | 12/1995 | Shepley | 235/375 |
| 5,558,742 | 9/1996 | Kiefer | 156/244.16 |
| 5,774,871 | 6/1998 | Ferro | 705/15 |

FOREIGN PATENT DOCUMENTS

| | | | |
|---|---|---|---|
| 62-103764 | 5/1987 | Japan | G06F 15/21 |
| 4-76767 | 3/1992 | Japan | G06F 15/21 |

*Primary Examiner*—Allen R. Macdonald
*Assistant Examiner*—Susanna Meinecke-Díaz
*Attorney, Agent, or Firm*—James P. Cleary; Townsend and Townsend and Crew LLP

[57] ABSTRACT

Food order content information that is presented to customers of food preparation establishments to report individualized nutritional information of meal items prepared and served. A system and method of receiving a service order having one or more meals, each meal made up of one or more meal items prepared using standardized meal components. A report listing the specific nutritional content of the standardized and customized meal items is provided to the customer in electronic or printed forms. The report includes information encoded in a computer-readable format for electronic storing and access.

26 Claims, 8 Drawing Sheets

SYSTEM AND METHOD FOR CREATING A FOOD ORDER SALES RECEIPT IDENTIFYING NUTRITIONAL INFORMATION OF A CUSTOMIZED MEAL

BACKGROUND OF THE INVENTION

The present invention relates generally to improvements in reporting of nutritional information to consumers, and more specifically to itemized reporting of nutritional information of specific food items served to a patron of a meal preparation establishment.

Consumers are becoming increasingly aware of food they eat and associated nutritional information of specific meal items. The prior art includes many instances of dietetic and nutritional information systems for use at home or when purchasing food items from a supermarket. These prior art systems assist a consumer with evaluation or preparation of meals having a desired nutritional profile or other preselected characteristics.

However, these systems are inadequate to properly categorize and tabulate nutritional information for meals prepared by someone else. For example, a patron of a meal preparation establishment, such as a restaurant or delicatessen, is usually totally unaware of specific or detailed nutritional information or content for these meal items. At best, some quick service restaurants provide average nutritional information for selected standardized meal items. This information can be quite inaccurate for specific meals prepared at these establishment, especially when a consumer customizes the meal items to add or delete meal components of the standardized items. The consumer, using prior art systems, is not in a position to evaluate nutritional information of the specific meal that was prepared by the establishment, nor is the consumer able to accurately evaluate the effect of any customizations to the meal items.

It is another disadvantage of prior art systems in that they fail to differentiate food items purchased for several people, or several meals. The prior art systems either are designed for operation with a single consumer, or nutritional information is coalesced into a single value, or averaged to provide an inaccurate value for a specific meal consumed by a specific consumer.

It is yet another disadvantage of prior art systems in that they fail to provide to the consumer a report having the nutritional information encoded in a computer-readable format, alone or in combination with a human-readable format.

It is yet a further disadvantage of prior art systems in that they fail to provide a point-of-sale reference to a report having nutritional information, where the report may be accessed from a database located apart from the point-of-sale.

SUMMARY OF THE INVENTION

The present invention provides a system and method for simply, efficiently and economically providing a food order content receipt that reports nutritional information for meal items prepared by a person other than a consumer. By incorporating the present invention, consumers who either need to know, or are curious about, the nutritional information of meal items prepared for them can be provided with desired information. The present invention addresses customization of otherwise standardized meal items, and provides for aggregation of nutritional information for orders having several meal items, and for those service orders including meals for several persons.

According to one aspect of the invention for a method for reporting nutritional information of food items served to a customer of a restaurant, the method includes the steps of receiving a service order from the customer requesting a meal including a first meal item and a second meal item, filling the service order by assembling the meal items from a plurality of standardized meal components, retrieving from a database a nutritional information component for each of the plurality of standardized meal components, aggregating, for each meal item, the nutritional information components for each of the plurality of standardized meal components included in each respective meal item to form a first aggregated nutritional component and a second aggregated nutritional component, printing an itemized list of the meal items and the aggregated nutritional components to produce a nutritional report, the nutritional report including the meal items and the aggregated nutritional components in an encoded computer-readable format, and providing the nutritional report to the customer.

According to a second aspect of the invention for a system for reporting nutritional information of food items served to a customer of a food preparation establishment, the system includes a database for storing nutritional information components of standardized food components, and a point-of-sale system, coupled to the database, for receiving a service order from the customer requesting a particular meal including a first meal item and a second meal item, where each meal item includes a standard set of meal components and the service order specifies a modified set of meal components different than the standard set, the point-of-sale system retrieving from the database specific nutritional information components for each standardized meal component to be used in the modified set of meal components, aggregating the specific nutritional information components for each standardized meal components included in the meal items to form a first and a second aggregated nutritional component corresponding to respective meal items, and processing an itemized list associating the meal items with aggregated nutritional components, to produce a nutritional report in an encoded, machine readable format.

According to a third aspect of the present invention for a method for reporting nutritional information of food items served to a customer of a restaurant, the method includes the steps of receiving a service order from the customer requesting a meal including a first meal item and a second meal item, filling the service order by assembling the meal items from a plurality of standardized meal components, retrieving a nutritional information component for each of the plurality of standardized meal components, aggregating, for each meal item, the nutritional information components for each of the plurality of standardized meal components included in each respective meal item to form a first aggregated nutritional component and a second aggregated nutritional component, developing an itemized list of the meal items and the aggregated nutritional components to produce a nutritional report, the nutritional report including the meal items and the aggregated nutritional components, associating the nutritional report with a reference, providing the reference to the customer, and displaying, using a display system responsive to the reference, the nutritional report.

According to yet a fourth aspect of the present invention for a method for reporting nutritional information of food items served to a customer of a restaurant, the method includes the alternative steps of associating a set of meal components with a reference, providing the reference to the customer, and retrieving from a database responsive to the reference nutritional information for each meal component, whereupon the nutritional information may be aggregated and processed in an itemized list.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawings. In the drawings, like reference numbers indicate identical or functionally similar elements.

DESCRIPTION OF THE SPECIFIC EMBODIMENTS

Figure 1:
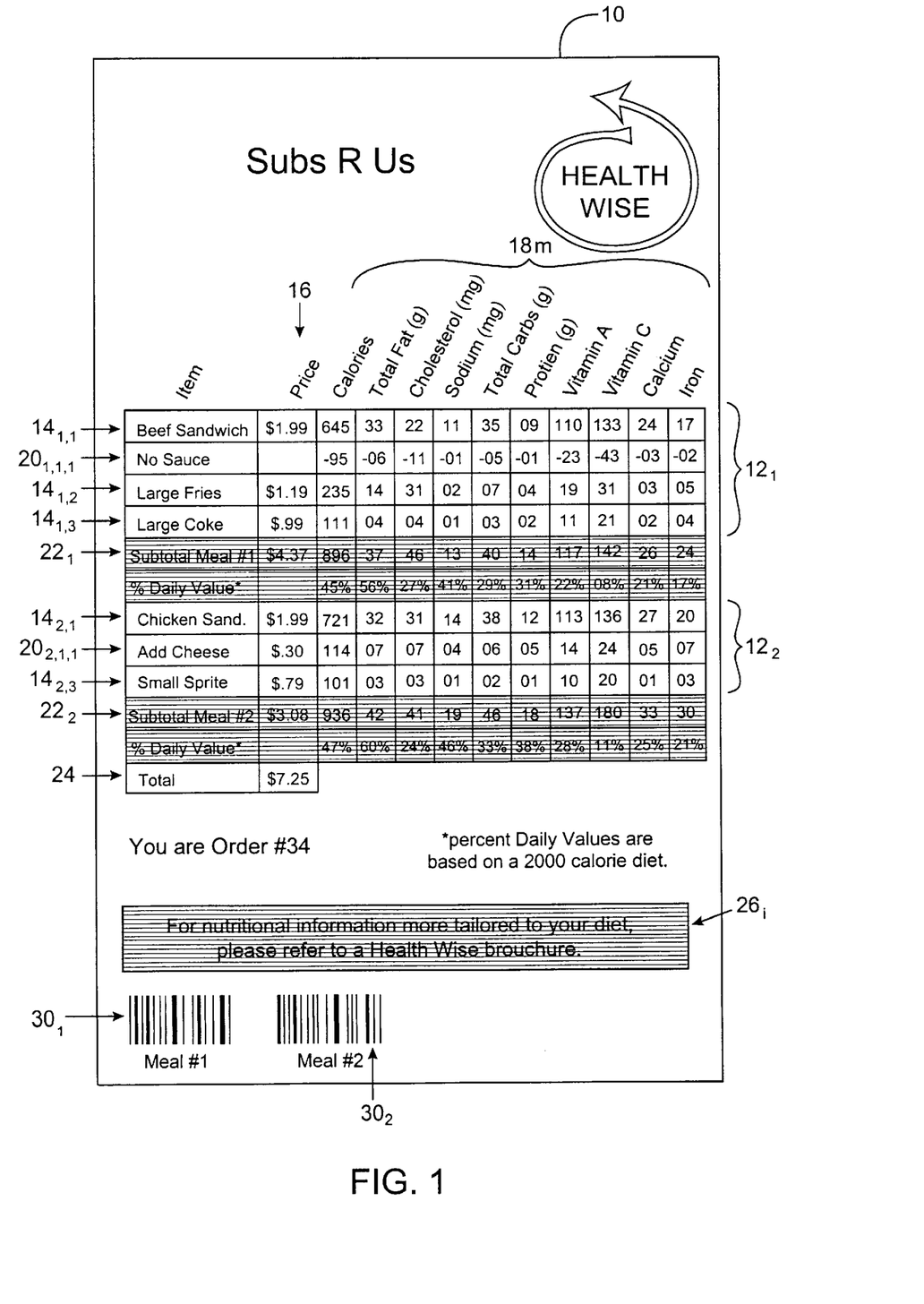
FIG. 1 is a sample food order content receipt produced according to the preferred embodiment of the present invention.

FIG. 1 is a sample food order content receipt 10 produced according to the preferred embodiment of the present invention. Receipt 10 identifies a first meal 12, and a second meal 12₂ ordered by a customer of a food preparation establishment. In the preferred embodiment, the food preparation establishment is a quick service restaurant that is characterized as having standardized meal items made up of standardized meal components. While the following description is made in the context of the preferred embodiment, it is understood that modifications to the described system enable application of the present invention to other food preparation establishments, such as full service restaurants, delicatessens, convenience shops, food vendors, sports stadium concessionaires, etc.

Each meal $12_i$ includes several meal items $14_{ij}$ that are standardized, unless otherwise customized by the customer. Standardization, in the context of the preferred embodiment, refers to predefinition of ingredients and components in preselected and repeatable portion sizes. Each meal item $14_{ij}$ that may be ordered from the food preparation establishment is made up from a plurality of standardized meal components. For example, first meal $12_1$ includes a beef sandwich as first meal item $14_{1,1}$, a large fries as a second meal item $14_{1,2}$, and a large COKE soda as third meal item $14_{1,3}$.

Receipt 10 includes a price column 16 and one or more nutritional information columns $18_m$. Receipt 10 associates, for each meal item $14_{ij}$, a price and specific nutritional information corresponding to the particular nutritional column 18. For example, meal item $14_{1,1}$, a beef sandwich, has a price of $1.99 listed in price column 16. First nutritional information column $18_1$ lists associated calorie information, second nutritional information column $18_2$ lists associated fat content, third nutritional information column $18_3$ lists associated cholesterol content, and so on. Other nutritional information, such as calories, grams of protein, sodium, or carbohydrates, totals, daily allowances (USRDA), any synthetic chemicals, toxins, preservatives, all nutrients (water, carbohydrates, fats, proteins, vitamins, minerals, fiber), comparable numbers from competitors, could be reported to the customer. In some instances, it may be desirable to allow a customer to select a specific type of report that lists customer desired information, or to otherwise customize the particular nutritional information reported to the customer. Receipt 10 may also include fields for identifying a specific food preparation establishment, time, date, register number, order number, amount tendered, change due, etc.

It is one feature of a food preparation establishment to permit customers to customize the otherwise standardized meal items. A meal item $14_{ij}$ may be customized by adding or deleting one or more standardized meal components $20_{i,j,k}$. For example, for first meal $12_1$, first meal item $14_{1,1}$ has a first meal component $20_{1,1,1}$ deleted. Likewise, second meal $12_2$ has addition $20_{2,1,1}$ to second meal item $14_{2,1}$. Any price adjustments reflected by the modification of the meal components would be entered into price column 16, and any nutritional information appropriate for nutritional information columns $18_m$ are listed next to the written description of the particular meal component $20_{i,j,k}$.

For each meal $12_i$, entries in price column 16 and nutritional information columns $18_m$ are aggregated into a sub-total row $22_i$. Thus, first meal $12_1$ has a first sub-total row $22_1$ that lists the total price of meal items $14_{1j}$ (including any modifications due to customization of a particular meal item), and aggregated nutritional information. Similarly, any other meals included on the same food order content receipt 10 are also aggregated into sub-totals.

In FIG. 1, the price, total calorie content, fat, cholesterol, sodium, carbohydrates, protein, vitamin A, vitamin C, calcium and iron for each meal, meal item and customizing meal component are listed. Receipt 10 also includes a total field 24 for aggregating the prices from the sub-total fields $22_i$. In some embodiments, it may be desirable to total not only price column 16, but also nutritional information columns $18_m$.

According to the preferred embodiment, receipt 10 includes nutritional commentary fields $26_i$. There may be one nutritional commentary field for the entire receipt 10, or per meal item $12_i$. The nutritional commentary fields $26_i$ may provide the customer with additional information about the corresponding meal $12_i$, meal item $14_{ij}$, or customizing meal component $20_{i,j,k}$. Or, the contents of the nutritional commentary fields $26_i$ may, in some cases, be predefined for particular situations, or randomly selected from a pool of appropriate nutritional commentary messages to enhance a repeat customer's experience when patronizing a food preparation establishment using the present invention.

Further according to the preferred embodiment, receipt 10 includes a machine-readable code $30_i$ encoding in a machine-readable format the meal items $14_{ij}$ and the aggregated nutritional information $18_m$. In a specific embodiment, the machine-readable code $30_i$ is a bar code printed on the face of the receipt 10. In alternative preferred embodiments, machine-readable code may be any printable code information, such as a matrix of dots, a magnetic strip, etc. Each meal $12_i$ may have its own machine-readable code $30_i$, or a single code may represent the aggregate, or any part thereof, of the human-readable information printed on the receipt 10. In other alternatives to the preferred embodiment, the receipt 10 may be printed with either human-readable information or encoded in a machine readable format, such as a display or a memory.

The machine-readable code 30$_i$ allows the information on each receipt to be scanned into a software program and/or stored in a computer. The customer may then develop a database of dietary information from the receipts 10, access the database electronically, and utilize the information in a large variety of ways. For example, the customer may manipulate the information to monitor the total price amount spent on particular food items during a given time frame. Or, the customer may monitor his or her fat intake over time.

In some instances, part of a service order may include meal items prepared by a customer at a "self-serve" station of the food-preparation establishment. The food preparation establishment may optionally provide the customer with information to calculate a nutritional content of the food components the customer chooses. Optionally, receipt 10 may include a field for entering this information. In some cases, an entry for these self-serve items on receipt 10 may be blank, include a range of values, include an average value, or otherwise indicate that the entry is unknown or approximate. If the customer chooses standardized portions of food components, entry of this information permits especially accurate reporting of corresponding nutritional information.

Figure 2A:
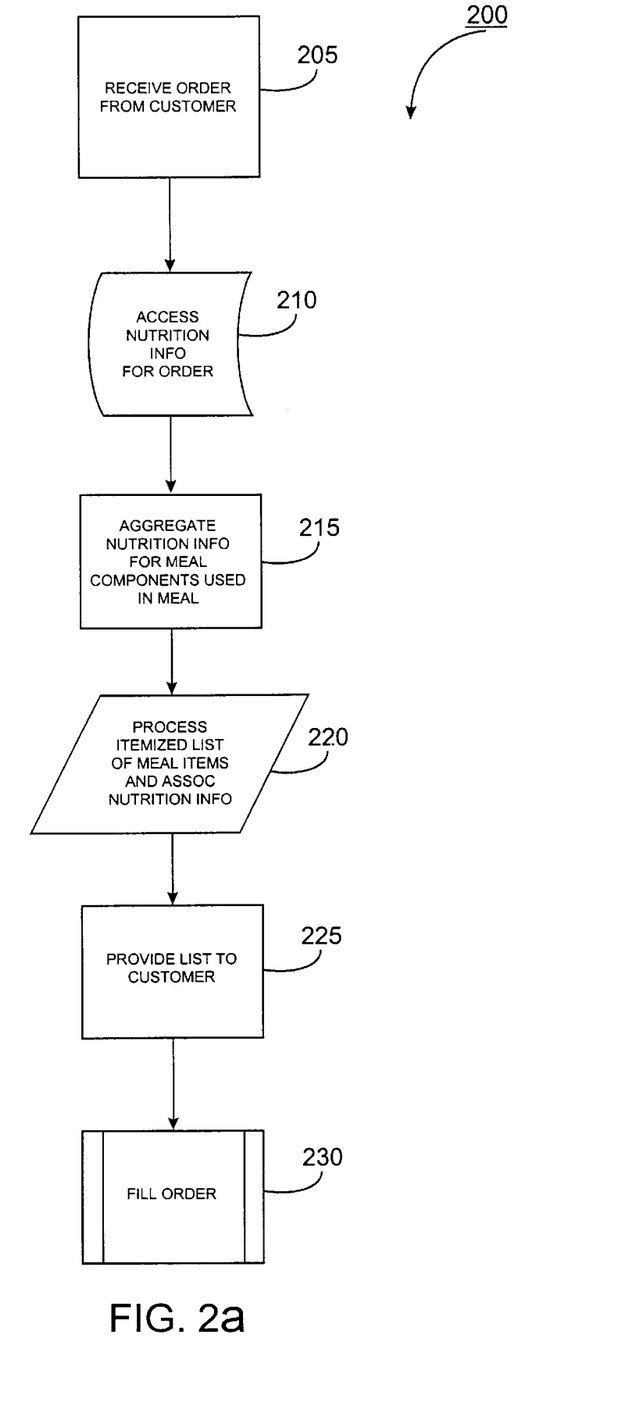
FIG. 2a is a flowchart illustrating a preferred process of the present invention.

FIG. 2a is a flowchart 200 illustrating a preferred process, steps 205–230, for a food order content receipt printing method of the present invention. Flowchart 200 is preferably implemented using a conventional point-of-sale (POS) system, or may be implemented using a kiosk or interactive station. POS will hereafter refer generically to retail systems employed in merchant facilities for processing customer orders and money transactions, including such systems as electronic cash registers (ECRs), and the like. Likewise, "kiosk" will hereafter refer generically to a database-oriented interactive computer station provided by the food preparation establishment and accessible by the customer. The kiosk may have a monitor-type display system and/or hardcopy printing display system for presenting information to the customer. In a preferred embodiment, the kiosk receives nutritional information from the POS system and a customer may access the information by providing to the kiosk a reference. In an alternative preferred embodiment, the kiosk stores nutritional information corresponding to the various meal components found on a menu of the food-preparation establishment, and the customer can access the information directly from the kiosk.

At step 205, RECEIVE ORDER FROM CUSTOMER, a customer provides the quick service restaurant, via the POS system or the kiosk, with a service order identifying one or more meals, each having one or more meal items. The meal items will be assembled later from predefined portions of standardized meal components. The service order may include one or more customized meal items. After receiving the order, the system advances to step 210, ACCESS NUTRITION INFO FOR ORDER.

It is at step 210 wherein the food preparation establishment performs a database lookup to extract desired nutritional information that corresponds to the meal items, standardized and customized standardized (e.g., predefined meals that are modified per a customer's request), identified in the service order received at step 205. Following step 210, the system performs step 215, AGGREGATE NUTRITION INFO FOR MEAL COMPONENTS TO BE USED IN MEAL. It is at step 215 wherein the nutrition information, and price information when price is included as it is shown on receipt 10 in FIG. 1, is associated with the standardized meal items and meal components and the sub-total amounts are calculated.

Following step 215, the system performs step 220, PROCESS ITEMIZED LIST OF MEAL ITEMS AND ASSOCIATED NUTRITIONAL INFORMATION as a nutritional report. The nutritional report of step 220 is preferably as shown by receipt 10 shown in FIG. 1 and may be either displayed on a screen, as a printed hardcopy, or stored on a computer disk. In alternate embodiments of the present invention, the nutritional report may be separate from an amount due receipt typically provided by the point-of-sale system. The report processed at step 220 may further be in an encoded computer-readable format, or human-readable format, or both.

After processing the itemized list at step 220, the process next performs step 225 to PROVIDE LIST TO CUSTOMER. Step 225 provides feedback to the customer regarding the nutritional information of the meal items actually making up the service order. Step 225 may be performed by the POS system providing the customer a printed receipt. Alternatively, the kiosk may either print the provided nutritional information and/or display the information for the customer. After step 225, the process concludes with step 230, FILL ORDER. It is at step 230 wherein the requested standardized and customized meal items are prepared and provided to the customer.

In the preferred embodiment, all meal items are assembled from standardized portions of meal components having predetermined nutritional characteristics. For the preferred embodiment, use of standardized portions of meal components permits predetermination of nutritional information for standardized meal items. This information is stored in the database that is accessed at step 210. Additionally, storing nutritional information for the standardized portion information allows the nutritional information reported to the customer to accurately match the nutritional content of the food prepared for the customer.

In some applications, it may be necessary for detailed nutritional analyses, such as by a commercially available testing lab, to establish nutritional information for the standardized meal components used in assembling the meal items of the service order.

A reordering of steps 205–230 produces an alternate process that may be better suited to a full-service restaurant. By executing process step 230 immediately after step 205, and following it by steps 210–225, an alternate preferred embodiment is possible in which a service order is filled prior to generating the nutritional report. Thus, the nutritional report includes those items and components that were used in preparing any particular meal. Such a system allows some additional flexibility for variation in the meal preparation process as the meal component information does not have to be known in advance as accurately as with the preferred embodiment.

In another alternative preferred embodiment, a service order may be made by a customer directly entering information on a touch-screen, such as might be provided with the kiosk. Thereafter, the customer may receive a prepurchase report, such as by use of the touch-screen, and approve the service order after reviewing the nutritional information. A similar result is achieved by providing the customer with a printed nutritional report prior to finalizing the service order. Such prepurchase approval permits the customer to react to the aggregated nutritional information for the meal items of the pending service order, prior to submitting an order to the POS system.

Figure 2B:
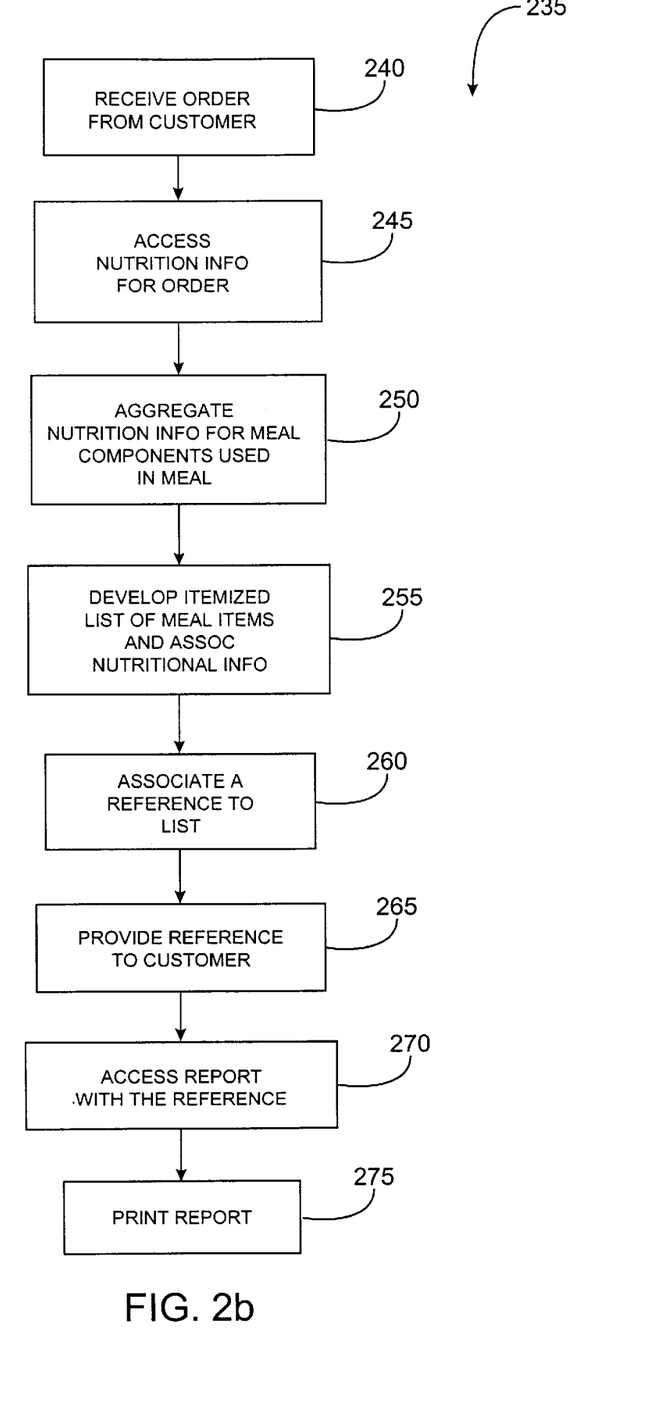
FIG. 2b is a flowchart illustrating an alternative process of the present invention.

FIG. 2b is a flowchart 235 illustrating another alternative embodiment of the present invention. In flowchart 235, steps 240–250 are identical to steps 205–215 described above with reference to FIG. 2a. At step 255, DEVELOP ITEMIZED LIST OF MEAL ITEMS AND ASSOC NUTRITIONAL INFO, the system will develop an itemized list of meal items and associated nutritional information for a nutritional report. The nutritional report may include the meal items, the aggregated nutritional components, and data for encoding the machine-readable code. At step 260, ASSOCIATE A REFERENCE TO LIST, an encoded reference is associated with the itemized list. At step 265, the system will provide the reference to the customer. Again, information or references provided to the customer may be obtained from the POS system or the interactive kiosk.

Having been provided with the reference, at step 270 the customer accesses the itemized list in the nutritional report with the provided reference number. In the preferred embodiment, the customer takes the reference to the kiosk and interactively negotiates with the kiosk via a user input device. The kiosk can include a database of nutritional information, or may be connected to a central database of the POS system, from which nutritional information is downloaded. Upon being accessed, the nutritional report will be printed on a display or as a hardcopy report at step 275. The customer may compile multiple reference numbers for future access to cumulative or associated nutritional reports. The printed nutritional report from step 275 is preferably as shown by receipt 10 shown in FIG. 1. However, in alternatives to the preferred embodiment of the present invention, the nutritional report may be separate from an amount due receipt typically provided by the point-of-sale system, or the machine-readable code may be separate from the human-readable information.

Figure 3:
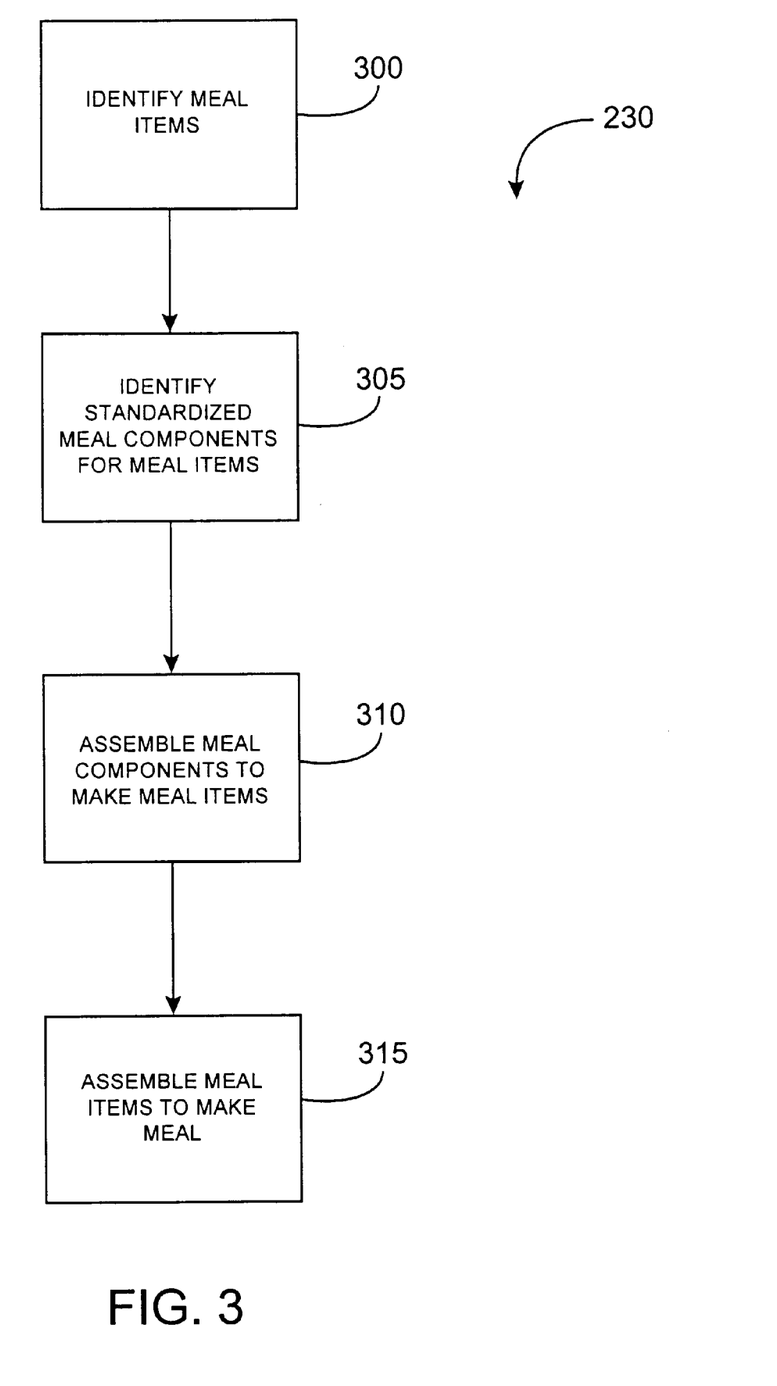
FIG. 3 is a detailed flowchart illustrating a preferred series of steps for the FILL ORDER step illustrated in FIGS. 2a and 2b.

FIG. 3 is a detailed flowchart illustrating a preferred series of steps for step 230 illustrated in FIG. 2a. Step 230 includes steps 300–315 to fill a service order from a customer. At step 300, meal items of the service order are identified. Next, at step 305, standardized meal components making up the meal items identified in step 300 are identified. This identification includes any customization instructions requested by the customer and conveyed via the service order. The customization information includes additional meal components to be added, meal components to be deleted, or some combination of both.

After identifying the standardized meal components, step 310 assembles the meal components into the meal items identified in step 300. Step 310 accounts for any customization information submitted by the customer. After assembling the meal items, the meal items are assembled into the appropriate meals (step 315). The assembled meals are then served to the customer.

Figure 4:
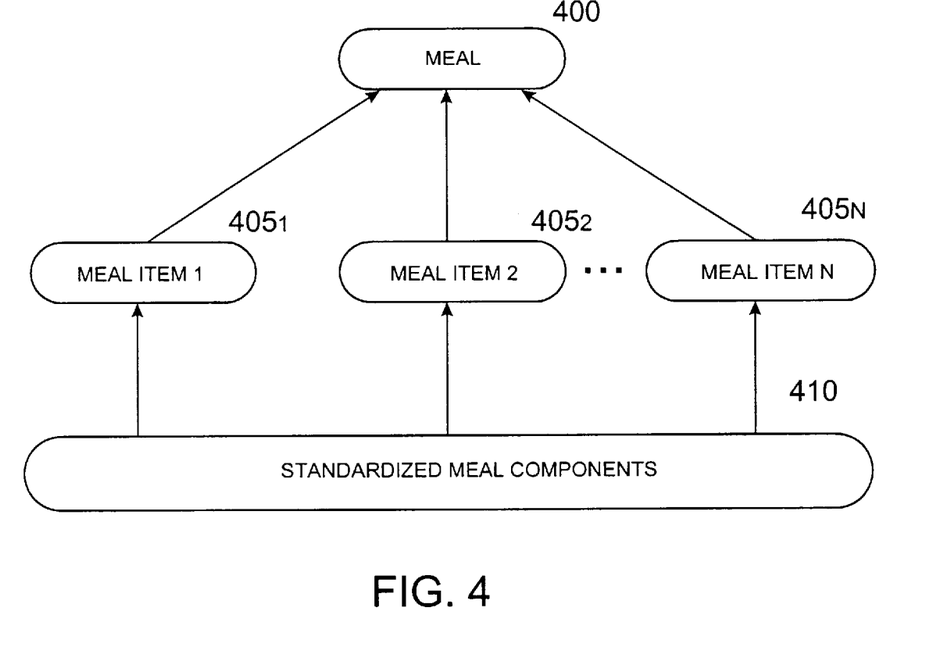
FIG. 4 is a conceptual view illustrating a hierarchy of food items according to a preferred embodiment of the present invention.

FIG. 4 is a conceptual view illustrating a hierarchy of food items according to a preferred embodiment of the present invention. As illustrated, a meal 400 is made up of one or more meal items $405_i$. Further, each meal item $405_i$ is made up of one or more standardized meal components 410.

Figure 5:
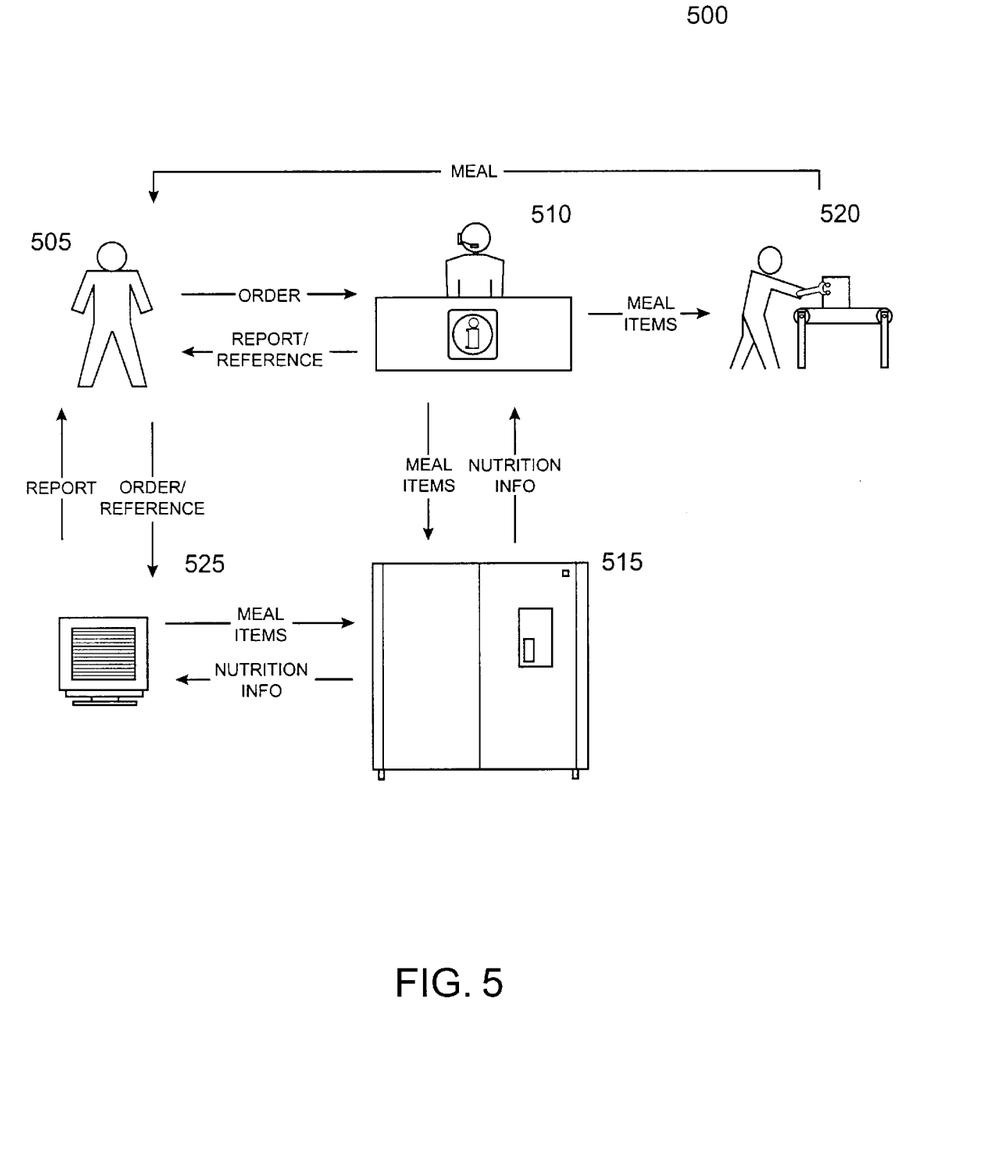
FIG. 5 is a process flow diagram illustrating a preferred embodiment of the present invention.

FIG. 5 is a process flow diagram 500 illustrating the preferred embodiment of the present invention. A customer 505 provides a service order to an order taker 510 who preferably operates the POS system. Or, the customer 505 may elect to provide the service order to the kiosk 525. In the preferred embodiment, order taker 510 or kiosk 525 receives the service order and enters requested meal items into a database processing system 515. Database processing system 515 returns nutrition information and optionally associated price information corresponding to the requested meal items to order taker 510. The database processing system 515 may also store the nutritional information for the customer 505 for later access through the kiosk 525.

In the preferred embodiment, order taker 510 prints a receipt 10 shown in FIG. 1 and provides this nutritional report to customer 505. Order taker 510 also provides a list of the meal items to an order filler 520 who assembles the requested meal items from standardized meal components and provides the meal to customer 505. The identification of meal items provided to database processing system 515 and order filler 520 includes any customization information for the standardized meal items, such as extra or additional components, or both, or for components to be removed.

In an alternative preferred embodiment, order taker 510 receives the service order and enters requested meal items into the database processing system 515, which develops an itemized list of the requested meal items and aggregated nutritional components for a nutritional report. The service order is associated with a reference, which is provided to the customer 505 by either the order taker 510 or via the kiosk 525. Based on the reference provided to the customer, nutritional information in the aggregate or by individual meal item is retrieved from the database for display on the kiosk 525 or printed. Printing the nutritional information may be accomplished by a printing system at either the order taker 510 or the kiosk 525.

In an another alternative preferred embodiment, the customer 505, having been provided with a reference to his or her service order, retrieves the nutritional information associated with the service order from a kiosk 525 having its own database, being connected to the database processing system 515, or being downloaded from the POS system. The kiosk 525 is established by the restaurant, and is physically separated from the POS system and the order taker 510. The kiosk 525 can retrieve nutritional information for each meal component ordered by the customer, or as an aggregated report for the entire service order. If the nutritional information is retrieved in components, the kiosk 525 aggregates the component nutritional information into nutritional information for each meal item. At the customer's option, the kiosk 525 will print a nutritional report having an itemized list of the requested meal items and aggregated nutritional components, as shown in FIG. 1. Furthermore, the kiosk 525 may store the individually tailored nutritional reports, or accumulate a customer's service orders and associated nutritional information over time.

In various embodiments, depending upon desired implementations, it is possible for order taker 510 to provide order filler 520 with meal item information prior to, or subsequent to, presentation of the nutritional report to customer 505.

Figure 6:
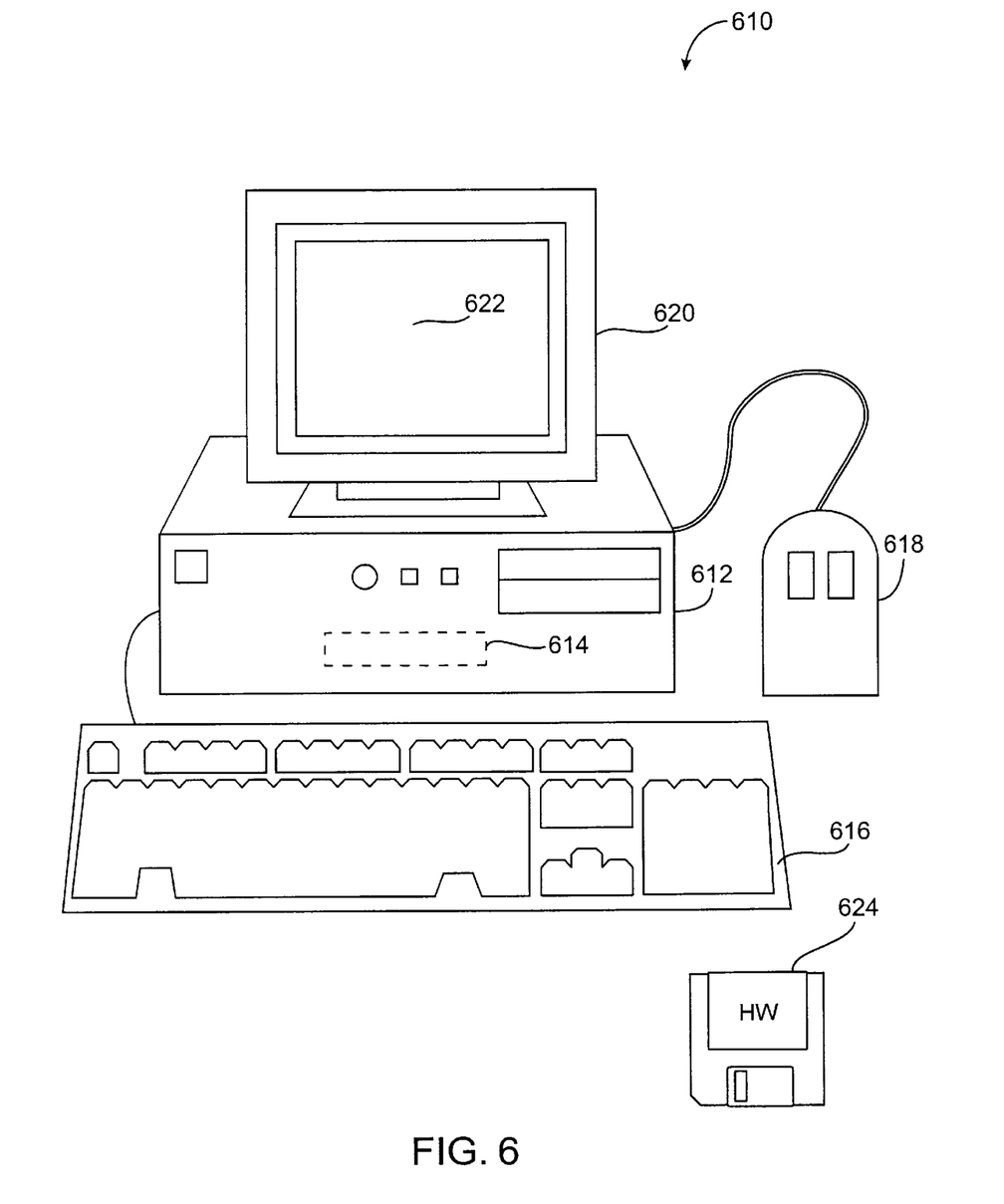
FIG. 6 is a representative perspective view of a computer system for implementing a preferred embodiment of the present invention.

FIG. 6 is an illustration of a workstation 610, for use as with the POS system or as the kiosk, which includes a computer system 612 coupled to a fixed disk 614, a keyboard 616, a mouse 618, and a monitor 620. Monitor 620 is shown with a display surface 622. A floppy disk 624, capable of storing computer accessible information and program information, may also be optionally part of workstation 610. The examples that follow refer to an image being displayed on display surface 622 of monitor 620 resulting from access and processing of database information stored on fixed disk 614 upon execution of the preferred embodiment. However, the invention is equally applicable to variations such as where the display device is a printer and the display surface is a printed page, or the display device is some other pixelated display device. The source of the database information also need not be disk 614, but could be keyboard 616, disk 624, or some other input means not shown (such as a communications channel or network link to a centralized database), or a combination of the above. Additionally, disk 624 may include suitable program instruction to cause workstation 610 to execute the process steps shown in FIG. 2 and FIG. 3 to print receipt 10 shown in FIG. 1.

Figure 7:
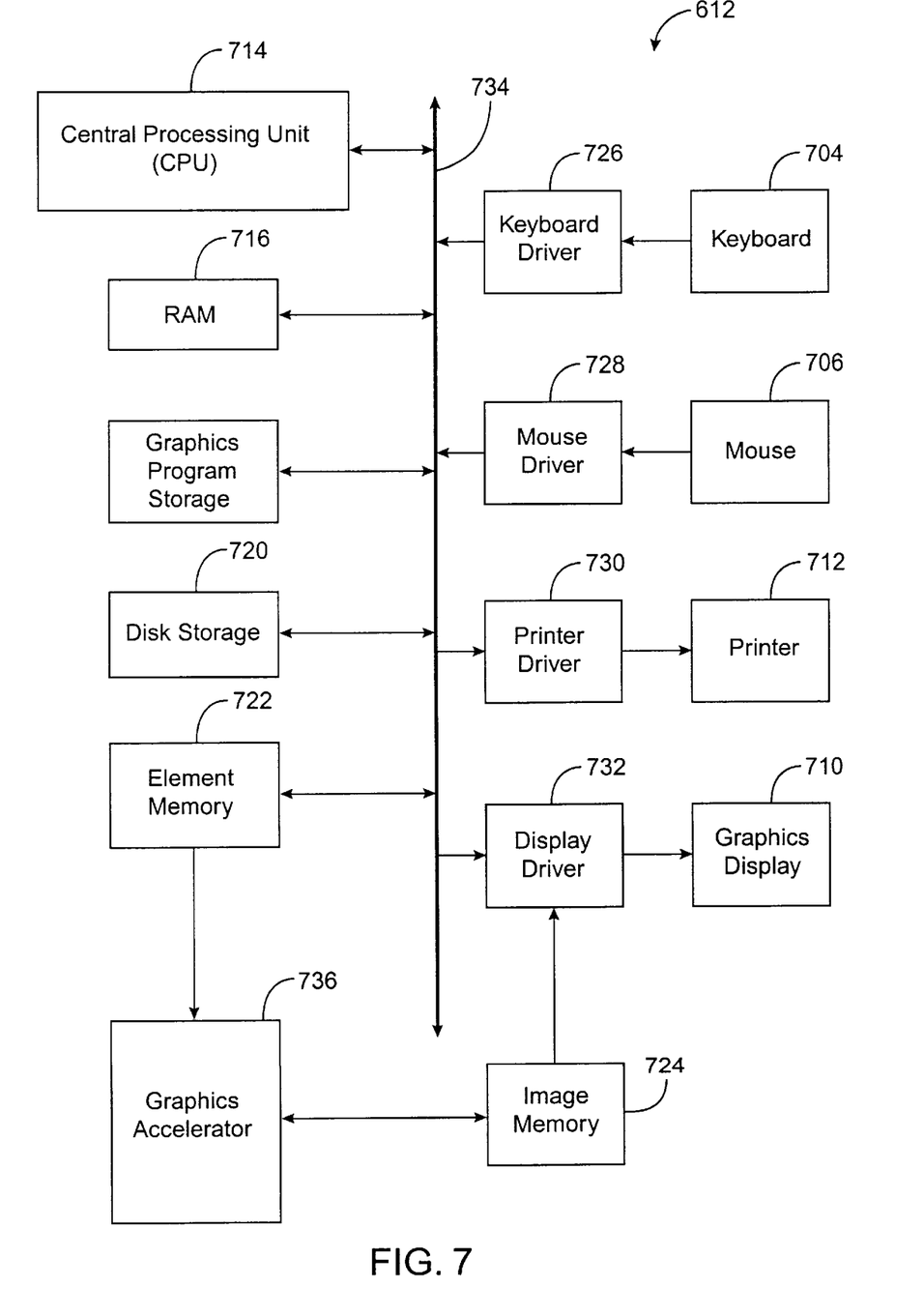
FIG. 7 is a block schematic diagram illustrating components of the computer system shown in FIG. 6.

FIG. 7 is a block diagram of computer system 612. Computer system 612 is shown with a central processing unit ("CPU") 714, random access memory ("RAM") 716, a disk 720 (e.g., 614 in FIG. 6), a mouse driver 728, a keyboard driver 726, an element memory 722, an image memory 724, an optional graphics accelerator 736, a printer driver 730, and a display driver 732 all coupled by a computer bus 734. Display driver 732 is shown coupled to a graphics display 710 (e.g., monitor 620) and printer driver 730 is coupled to a printer 712. In variations of computer system 612, one or more elements might be combined or removed, or modified, depending upon a particular embodiment. For example image memory 724 might be a part of RAM 716, or mouse driver 728 and keyboard driver 726 might be combined. FIG. 7 also includes any interface cards, such as those employed by some POS systems (particularly ECR systems) or kiosks.

CPU 714 is used to process instructions of a nutritional report generation program to generate receipt 10, and possibly other computing tasks. Typically, CPU 714 controls the interaction of the items coupled to bus 734. For example, CPU 714 uses RAM 716 to store variables and data arrays used in processing nutritional and price data, disk 720 to permanently store instructions of the nutritional report generation program, mouse driver 728 to get input from a mouse 706 (mouse 618 shown in FIG. 6), and keyboard driver 726 to get input from a keyboard 704 (e.g., keyboard 616 in FIG. 6).

In a nutritional report generating operation, CPU 714 first moves a nutritional report generating program to more accessible nutritional program storage 720, and waits for meal item and customization information to be entered by an input device. Running the nutritional report program causes CPU 714 to read nutritional information from a database memory coupled to bus 734 to generate a nutritional report and corresponding price information of a service order submitted by a customer, which is then stored in image memory 724. The processing can either be done all by CPU 714, or some operations might be passed to graphics accelerator 736, or to a remote processing center for remote processing. Once the display image is generated, it can be moved from image memory 732 to display driver 732 or to printer driver 730, which outputs the image to one or more display devices.

In preferred embodiment, the details of the operation of computer system 612 needed to generate receipt 10 from a service order and stored database information are determined by the nutritional report generation program stored in storage 720. The details of these operations are shown in the flowcharts and process drawings of FIGS. 2–5.

In a preferred embodiment of the present invention, computer system 610 is a point-of-sale system employing diskless workstations accessing storing and processing resources over a computer network. Monitor 620 may optionally be a touch screen for entry of service orders and display of price and nutritional information prior to generation of receipt 10.

In conclusion, the present invention provides a simple, efficient solution to a problem of nutritional reports of food prepared and served by restaurants and the like. While the above is a complete description of the preferred embodiments of the invention, various alternatives, modifications, and equivalents may be used. Therefore, the above description should not be taken as limiting the scope of the invention which is defined by the appended claims.

What is claimed is:

1. A method for reporting nutritional information of food items served to a customer of a restaurant, comprising the steps of:

receiving a service order from the customer requesting a meal including a first meal item and a second meal item wherein each said meal item includes a standard set of meal components and wherein said service order specifies a modified set of meal components different than said standard set; thereafter filling said service order by assembling said meal items specified by said modified set of meal components from a plurality of standardized meal components;

retrieving from a database a nutritional information component for each of said plurality of standardized meal components used in said modified set of meal components;

aggregating, for each meal item, said nutritional information components for each of said plurality of standardized meal components included in each respective meal item to form a first aggregated nutritional component and a second aggregated nutritional component;

printing an itemized list of said meal items and said aggregated nutritional components to produce a nutritional report, said nutritional report including said meal items and said aggregated nutritional components in an encoded computer-readable format; and providing said nutritional report to the customer.

2. The reporting method of claim 1 wherein the customer receives a receipt identifying said meal items and corresponding price information associated with said meal items; said nutritional report is integrated onto said receipt.

3. The reporting method of claim 2 wherein said nutritional report includes a printed nutritional commentary of a particular one meal item of said meal items.

4. The reporting method of claim 1 wherein said service order includes a third meal item and a fourth meal item for a second customer, and said aggregating step aggregates said nutritional information to form a third aggregated nutritional component and a fourth aggregated nutritional component for said third and fourth meal items and said nutritional report encodes said additional information.

5. The reporting method of claim 4 wherein the customer receives a receipt identifying said meal items and corresponding price information associated with said meal items, said nutritional report is integrated onto said receipt.

6. The reporting method of claim 5 wherein said nutritional report includes a printed nutritional commentary of a particular one meal item of said meal items.

7. The reporting method of claim 4 wherein said nutritional information for said first and second meal items are segregated into a first sub-total separate from said nutritional information of said third and fourth meal items which are segregated into a second sub-total and wherein said nutritional report encodes separately said first sub-total and said second sub-total.

8. The reporting method of claim 7 wherein said sub-totals are aggregated into a total and said nutritional report encodes said total.

9. The reporting method of claim 1 wherein said encoded format is a bar code.

10. The reporting method of claim I wherein said nutritional report includes said meal items and said aggregated nutritional components in two distinct formats: said encoded format and a human readable format.

11. A method for reporting nutritional information of food items served to a customer of a restaurant, comprising the steps of:

assembling a plurality of meal items from a plurality of standardized meal components;

receiving a service order from the customer requesting a meal including a first meal item from said plurality of meal items wherein each said meal item includes a standard set of meal components and wherein said service order specifies a modified set of meal components different than said standard set;

filling said service order by retrieving said first meal item specified by said modified set of meal components;

retrieving from a database a nutritional information component for each of said plurality of standardized meal components used in said modified set of meal components;

aggregating, for said first meal item, said nutritional information components for each of said plurality of standardized meal components included in said first meal item to form a first aggregated nutritional component;

processing an itemized list of said first meal item and said first aggregated nutritional component to produce a nutritional report including said itemized list in an encoded, computer-readable format; and providing said nutritional report to the customer.

12. The reporting method of claim 11 wherein said service order includes a request for a second meal including a second meal item from said plurality of meal items, said filling step retrieves said second meal item, said retrieving step retrieves said nutritional information components for each of said plurality of standardized meal components making up said second meal item, said aggregating step forms a second aggregated nutritional component from said nutritional information components corresponding to said plurality of standardized meal components used in said second meal item, and said printing step produces said nutritional report including said second meal item and said second aggregated nutritional component.

13. A method for reporting nutritional information of a food item served to a customer of a restaurant, comprising the steps of:

receiving a service order from the customer requesting a meal including a plurality of meal items wherein each said meal item includes a standard set of meal components and wherein said service order specifies a modified set of meal components different than said standard set; thereafter retrieving from a database a nutritional information component for each of said plurality of standardized meal components used in said modified set of meal components;

aggregating, for said meal item, said nutritional information components for each of said plurality of standardized meal components included in said meal item to form an aggregated nutritional component;

processing an itemized list of said meal item and said aggregated nutritional component to produce a nutritional report having said itemized list in an encoded, machine readable format; and providing said nutritional report to the customer.

14. The reporting method of claim 13 wherein said meal item is a standardized meal item having a preaggregated nutritional component, and wherein said retrieving step retrieves said preaggregated nutritional component.

15. The reporting method of claim 14 wherein said service order includes a customized meal item having a standardized meal component added to said customized meal item.

16. The reporting method of claim 15 wherein said retrieving step retrieves an additive nutritional information component from said database, and wherein said aggregating step adds said additive nutritional information component to said preaggregated nutritional component to produce said aggregated nutritional component for said customized meal item.

17. The reporting method of claim 16 wherein said service order includes a customized meal item having a standardized meal component removed from said customized meal item.

18. The reporting method of claim 17 wherein said retrieving step retrieves a subtractive nutritional information component from said database, and wherein said aggregating step subtracts said additive nutritional information component from said preaggregated nutritional component to produce said aggregated nutritional component.

19. The reporting method of claim 13 further comprising the step of filling said service order by assembling said meal item specified by said modified set of meal components from a plurality of standardized meal components.

20. A method for reporting nutritional information of a food item served to a customer of a food preparation establishment, comprising the steps of:

receiving a service order from the customer requesting a meal including a first meal item and a second meal item wherein each said meal item includes a standard set of meal components and wherein said service order specifies a modified set of meal components different than said standard set; thereafter retrieving from a database a nutritional information component for each of a plurality of standardized meal components to be used in said modified set of meal components;

aggregating, for each said meal item, said nutritional information components for each of said plurality of standardized meal components included in said meal items to form a first and a second aggregated nutritional component corresponding to respective ones of said meal items;

processing an itemized list associating said meal item with a first aggregated nutritional component and said second meal item with a second aggregated nutritional component to produce a nutritional report having said aggregated nutritional information encoded in a machine readable format; thereafter filling said service order by assembling said meal items specified by said modified set of meal components from said plurality of standardized meal components; and providing said nutritional report to the customer.

21. A system for reporting nutritional information of a meal served to a customer of a food preparation establishment, comprising:

a database for storing nutritional information components of standardized food components used by the food preparation establishment; and a point-of-sale system, coupled to said database, for receiving a service order from the customer requesting a particular meal including a first meal item and a second meal item wherein each said meal item includes a standard set of meal components and wherein said service order specifies a modified set of meal components different than said standard set, said point-of-sale system retrieving from said database a plurality of specific nutritional information components for each of a plurality of standardized meal components to be used in said modified set of meal components, said point-of-sale system for aggregating, for each said meal item, said specific nutritional information components for each of said plurality of standardized meal components included in said meal items to form a first and a second aggregated nutritional component corresponding to respective ones of said meal items, said point-of-sale system for processing an itemized list associating said meal item with a first aggregated nutritional component and said second meal item with a second aggregated nutritional component to produce a nutritional report in an encoded, machine readable format.

22. A method for reporting nutritional information of food items served to a customer of a restaurant, comprising the steps of:

receiving a service order from the customer requesting a meal including a first meal item and a second meal item wherein each said meal item includes a standard set of meal components and wherein said service order specifies a modified set of meal components different than said standard set; thereafter retrieving a nutritional information component for each of said plurality of standardized meal components used in said modified set of meal components;

aggregating, for each meal item, said nutritional information components for each of said plurality of standardized meal components included in each respective meal item to form a first aggregated nutritional component and a second aggregated nutritional component;

developing an itemized list of said meal items and said aggregated nutritional components for a nutritional report, said nutritional report including said meal items and said aggregated nutritional components; and associating said nutritional report with a reference;

providing said reference to the customer; and thereafter presenting, using a display system accessible by the customer and responsive to the reference, said nutritional report.

23. The method of claim 22 wherein said display system is a printer and said presenting step generates a hardcopy of said nutritional report.

24. The method of claim 22 further comprising the step of filling said service order by assembling said meal items specified by said modified set of meal components from a plurality of standardized meal components.

25. A method for reporting nutritional information of food items, served to a customer of a restaurant, comprising the steps of:

receiving a service order from the customer requesting a meal including a first meal item and a second meal item wherein each said meal item includes a standard set of meal components and wherein said service order specifies a modified set of meal components different than said standard set; thereafter filling said service order by assembling said meal items specified by said modified set of meal components from a plurality of standardized meal components;

associating said modified set of meal components with a reference;

providing said reference to the customer; and thereafter retrieving from a database accessed by the customer and responsive to said reference, a nutritional information component for each of said plurality of standardized meal components used in said modified set of meal components;

aggregating, for each meal item, said nutritional information components for each of said plurality of standardized meal components included in each respective meal item to form a first aggregated nutritional component and a second aggregated nutritional component; and thereafter processing an itemized list of said meal items and said aggregated nutritional components to produce a nutritional report, said nutritional report including said meal items and said aggregated nutritional components.

26. A method for reporting nutritional information of food items served to a customer of a restaurant, comprising the steps of:

assembling a plurality of meal items from a plurality of standardized meal components;

receiving a service order from the customer requesting a meal including a first meal item from said plurality of meal items wherein each said meal item includes a standard set of meal components and wherein said service order specifies a modified set of meal components different than said standard set;

filling said service order by retrieving said first meal item specified by said modified set of meal components; and thereafter retrieving, from a database accessible by the customer and established by the restaurant, a nutritional information component for each of said plurality of standardized meal components used in said modified set of meal components;

aggregating, for said first meal item, said nutritional information components for each of said plurality of standardized meal components included in said first meal item to form a first aggregated nutritional component; and presenting, on a display system accessible to the customer and operated by the restaurant, an itemized list of said first meal item and said first aggregated nutritional component to produce a nutritional report including said itemized list in an encoded, computer-readable format.

* * * * *